(12) United States Patent
Sutter et al.

(10) Patent No.: US 8,560,669 B2
(45) Date of Patent: Oct. 15, 2013

(54) TRACKING IDENTIFIER SYNCHRONIZATION

(75) Inventors: Paul Sutter, San Francisco, CA (US); Naveen Nalam, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 999 days.

(21) Appl. No.: 11/862,053

(22) Filed: Sep. 26, 2007

(65) Prior Publication Data

US 2009/0083442 A1    Mar. 26, 2009

(51) Int. Cl.
G06F 11/30    (2006.01)

(52) U.S. Cl.
USPC ............................. 709/224; 709/228; 709/227

(58) Field of Classification Search
USPC ................. 709/245, 217–219, 224, 227, 228
See application file for complete search history.

(56) References Cited

U.S. PATENT DOCUMENTS

| | | | |
|---|---|---|---|
| 6,073,241 A * | 6/2000 | Rosenberg et al. ............... 726/3 |
| 6,314,492 B1 | 11/2001 | Allen et al. |
| 6,336,135 B1 | 1/2002 | Niblett et al. |
| 6,438,592 B1 * | 8/2002 | Killian ......................... 709/224 |
| 6,976,077 B1 | 12/2005 | Lehew et al. |
| 6,993,137 B2 | 1/2006 | Fransdonk |
| 6,993,590 B1 | 1/2006 | Gauthier et al. |
| 7,177,901 B1 | 2/2007 | Dutta |
| 7,216,149 B1 | 5/2007 | Briscoe et al. |
| 7,240,365 B2 | 7/2007 | de Jong et al. |
| 7,257,546 B2 | 8/2007 | Ebrahimi et al. |
| 7,606,897 B2 | 10/2009 | Izrailevsky et al. |
| 7,752,261 B1 | 7/2010 | Nalam |
| 7,904,520 B2 * | 3/2011 | Neal et al. ..................... 709/206 |
| 7,958,191 B1 | 6/2011 | Nalam |
| 8,041,303 B2 | 10/2011 | Jiang et al. |
| 8,112,550 B2 * | 2/2012 | Wilson ......................... 709/248 |
| 2002/0152461 A1 * | 10/2002 | Istvan ............................. 725/32 |
| 2003/0046159 A1 | 3/2003 | Ebrahimi et al. |
| 2005/0216844 A1 | 9/2005 | Error et al. |
| 2005/0223093 A1 * | 10/2005 | Hanson et al. ................ 709/224 |
| 2006/0265495 A1 | 11/2006 | Butler et al. |
| 2006/0282327 A1 * | 12/2006 | Neal et al. ....................... 705/14 |
| 2007/0260512 A1 | 11/2007 | Sattley et al. |
| 2008/0004958 A1 | 1/2008 | Ralph et al. |
| 2008/0086368 A1 | 4/2008 | Bauman et al. |

(Continued)

OTHER PUBLICATIONS

PCT International Search Report, PCT/US2008/070550, Jan. 19, 2009, 2 pages.

(Continued)

*Primary Examiner* — Kenneth R Coulter
(74) *Attorney, Agent, or Firm* — Fenwick & West LLP

(57) ABSTRACT

A tracking identifier synchronization system using a convergent selection method comprises first party instructions accessed through a content provider and a synchronization system comprising a receiver, a composer and an output. First party instructions direct the client to submit a request comprising a third party cookie to a synchronization system. The composer generates setting instructions for execution at the client. Setting instructions comprise instructions to use a client-executed convergent selection method to select values first party cookies and, optionally, reporting instructions directing the client to transmit the values of client tracking identifiers. Repeated invocation of client-executed convergent selection methods results in the convergence of cookie values for many operational cases. Optionally, the synchronization system may generate third party cookie(s) using a convergent selection method based on the reporting data and compose a second set of third party cookie setting instructions for execution at the client.

16 Claims, 2 Drawing Sheets

(56) References Cited

U.S. PATENT DOCUMENTS

| | | | |
|---|---|---|---|
| 2008/0092058 A1* | 4/2008 | Afergan et al. | 715/745 |
| 2008/0126567 A1* | 5/2008 | Wilson | 709/248 |
| 2008/0146160 A1 | 6/2008 | Jiang et al. | |
| 2008/0147480 A1 | 6/2008 | Sarma et al. | |
| 2008/0154933 A1* | 6/2008 | Galvin et al. | 707/102 |
| 2008/0270412 A1 | 10/2008 | Udayasankar et al. | |
| 2008/0306830 A1* | 12/2008 | Lasa et al. | 705/26 |
| 2009/0024748 A1* | 1/2009 | Goldspink et al. | 709/228 |
| 2009/0064173 A1* | 3/2009 | Goldspink et al. | 719/311 |
| 2009/0172091 A1* | 7/2009 | Hamel | 709/203 |
| 2011/0125595 A1* | 5/2011 | Neal et al. | 705/14.73 |

OTHER PUBLICATIONS

PCT Written Opinion, PCT Application No. PCT/US2008/070550, Jan. 19, 2009, 4 pages.

* cited by examiner

First party instructions are established on a networked content publisher (Step 200).

First party instructions are executed at the client device thereby submitting the request to the synchronization system (Step 210).

The request is received at the synchronization system and setting instructions are composed at the synchronization system in response to the request (Step 220).

The setting instructions are received at the client device (Step 230).

The setting instructions are executed at the client device (Step 240).

Optionally, reporting instructions are executed and information is sent to a third network resource (Step 250).

Optionally, the synchronization system receives some or all of the reporting information (Step 260).

Optionally, the synchronization system composes a second set of setting instructions using a server executed convergent selection method (Step 270).

Optionally, the synchronization server sends the second set of setting instructions to the client for execution at the client (Step 280).

Optionally, the client receives and executes the second set of setting instructions (Step 290).

Figure 2

TRACKING IDENTIFIER SYNCHRONIZATION

FIELD OF INVENTION

The invention relates to methods and systems for tracking client behavior.

BACKGROUND OF INVENTION

Visitor interaction with networked resources is often tracked using client tracking identifiers such as cookies. For a variety of reasons, tracking identifiers such as cookies may be rejected, deleted or corrupted over time. As a result, first and/or third party servers may serve new cookies with new cookie values to client systems. Over time, multiple cookie values may become associated with each visitor, visitor entity and/or client, complicating first party and/or third party tracking. For example, a first party and/or third party server may maintain a database of cookie values associated with a visitor entity based at least in part on a server-side history of first and/or third party cookie setting activities. These databases can grow very large, becoming slow and cumbersome to operate and maintain.

The number of client tracking identifiers associated with each visitor, visitor entity and/or client may be reduced by attempting to synchronize first and third party cookie values. However, security policies associated with many common browsers make synchronizing cookie values somewhat complicated. Security policies govern how client tracking identifiers such as cookies may be created, viewed, set and/or re-set. For example, a "same origin" security policy is intended to prevent the direct manipulation or access of cookies originating from a first origin by a document or script from another origin. For example, under such a security policy, a website publisher's cookie (a first party cookie) resident on a client system may not be directly read or altered by an analytics server (a third party server) which is external to the website publisher's security domain. Under a "same origin" security policy, cookie synchronization may require communication-intensive techniques which may introduce delays and consume server resources. Synchronization of other types of client tracking identifiers may be complicated by analogous difficulties. What is needed is a method for synchronizing client tracking identifiers from multiple security domains.

SUMMARY OF INVENTION

In one example, the current invention comprises a set of first party instructions accessed through a networked content provider, and a synchronization system comprising a receiver, a composer and an output. First party instructions may be provided by the networked content provider to the client device in response to a client request for content. First party instructions direct the client to submit a request to a synchronization system wherein the request comprises the values of one or more synchronization system client tracking identifiers resident on the client device, if obtainable. The synchronization system receives the request and the composer generates setting instructions for execution at the client device. The setting instructions comprise instructions to use a client-executed convergent selection method to select values for one or more networked content publisher client tracking identifier s. When a particular client repeatedly accesses one or more networked resources for providing content which are instrumented according to the current invention, client-executed convergent selection methods will be repeatedly invoked to select and set the networked content publisher client tracking identifiers. A convergent selection method is designed so that the set of resulting client tracking identifiers will converge to a small pool of client tracking identifiers for many operational cases. One example of a setting instruction using a convergent selection method is an instruction to examine existing networked content publisher client tracking identifiers and synchronization system client tracking identifiers, select the oldest value and instruct the client to set the networked content publisher client tracking identifiers to the same, oldest value.

In some examples according to the current invention, the setting instructions may further comprise reporting instructions such as, but not limited to, instructions directing the client device to transmit reporting information to a third network resource. Examples of reporting information include, but are not limited to: the value of one or more synchronization system client tracking identifiers, networked content publisher client tracking identifiers, first party cookies, third party cookies, cache variables, client tracking identifiers before and/or after execution of some or all of the other setting instructions. In some cases, the synchronization system may comprise the third network resource or be coupled to the third network resource.

In some examples according to the current invention, some or all of the reporting data may be provided to the synchronization system. Optionally, when the synchronization system receives some or all of the reporting data, it may examine the data and generate one or more synchronization system client tracking identifiers using a convergent selection method executed at the synchronization system. The synchronization system may then compose a second set of setting instructions for execution at the client instructing the client to set the one or more synchronization system client tracking identifiers. In some cases, the second set of setting instructions may comprise more than one type of instruction such as, but not limited to: HTTP header instructions and/or JavaScript™ scripts, scripts and/or programs. In some cases, the second set of setting instructions may instruct the client to set and/or reset networked content publisher client tracking identifiers, first party client tracking identifiers, browser cache variables, application variables and/or application cache variables instead of or in addition to setting or resetting synchronization system client tracking identifiers.

BRIEF DESCRIPTION OF DRAWINGS

FIG. 2 illustrates a method according to an example of the current invention.

DETAILED DESCRIPTION OF THE INVENTION

Figure 1:
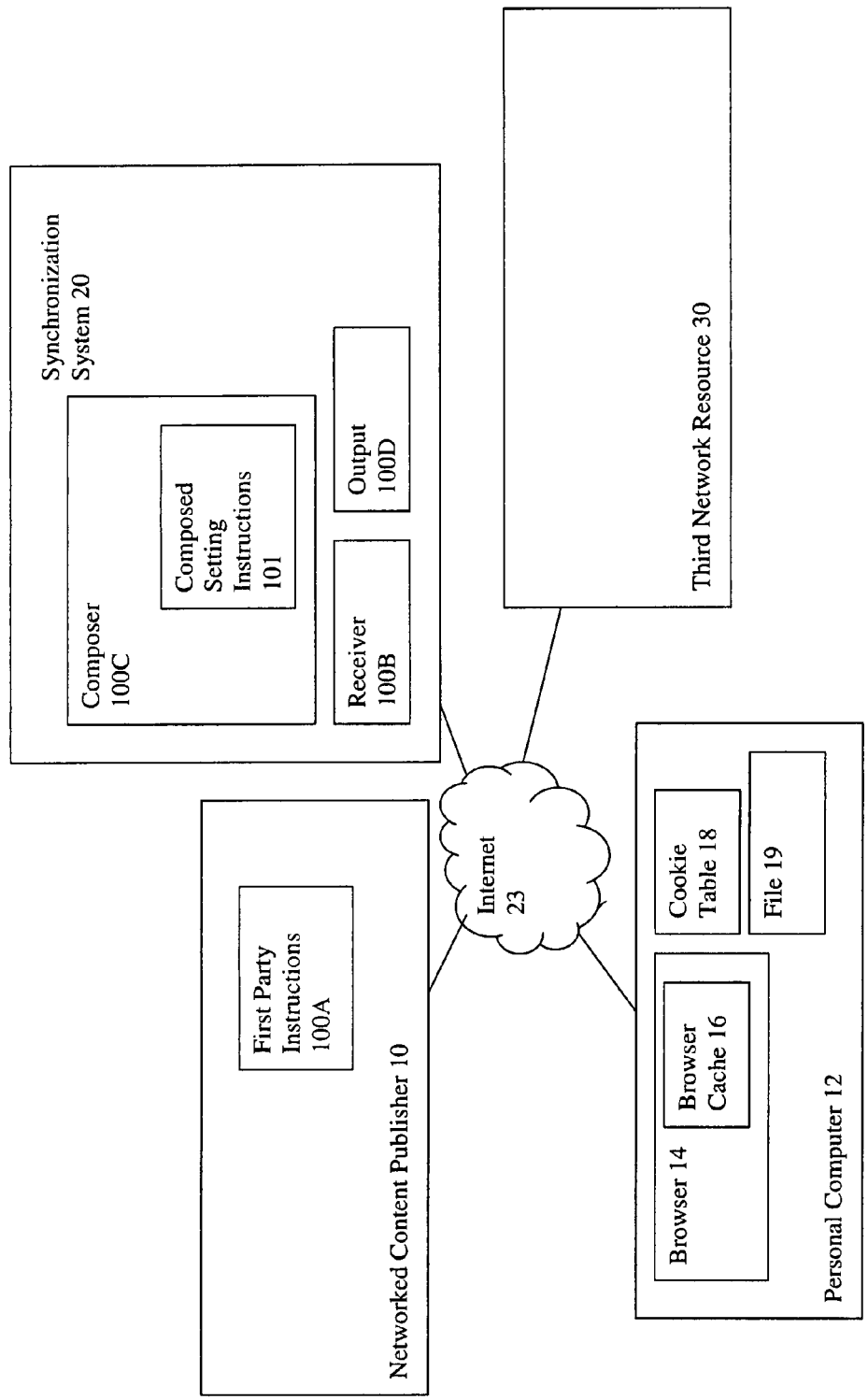
FIG. 1 illustrates an example of the current invention, a system for synchronizing client tracking identifiers on a client device.

FIG. 1 illustrates an example of the current invention (100A, 100B, 100C, and 100D taken together), a system for synchronizing client tracking identifiers on a client device 12. A system according to the current invention comprises a set of first party instructions (such as 100A) and a synchronization system (such as 20) comprising a receiver, a composer and an output (such as 100B, 100C and 100D, respectively). In this example, first party instructions 100A are resident on a networked content publisher 10; the first party instructions and the content may be provided to the client device in response to a client request for the content. In this example, networked content publisher 10 is a web server, the content comprises a client viewable website and first party instructions 100A are stored on a web page as an HTML tag. In this example, the networked content publisher is a first party server. Under a "same origin" security policy, the networked content publisher web server is capable of viewing, setting and/or re-setting it's own cookie on the client (in this case, a first party cookie), but is not capable of viewing, setting or re-setting cookies external to the networked content publisher web server's security domain, which would be considered third party cookies in this example. In other examples according to the current invention, networked content publisher may be a media or content server which may or may not be a web server; furthermore, the networked content publisher may or may not be subject to a "same domain" security policy, which could impact the ability to view, set and/or re-set various client tracking identifiers such as, but not limited to cookies. Furthermore, first party instructions may be stored and/or provided to the client in a variety of different forms and/or formats such as, but not limited to, a downloadable script or program.

According to the current invention, the synchronization system comprises at least one networked server. Depending on the configuration, the networked server may be persistently or intermittently networked. In some cases, the synchronization system may comprise multiple servers and/or storage devices. In some cases, the synchronization system may comprise a single monolithic system whereas in other examples according to the current invention, the synchronization system may be distributed across two or more systems, locations and/or networks.

For the example illustrated in FIG. 1, the client device is a personal computer 12 running a web browser 14. According to the current invention, client devices may be wired or wireless devices used for persistent or intermittent access to a network, a phone network, an internet, an intranet or the Internet such as, but not limited to, a computer, a PDA (Personal Digital Assistant), a DVR (digital video recorder), a PVR (personal video recorder) and/or a cell phone. In some cases, software for accessing networked resources such as a web browser may be installed on the client device. However, in other examples according to the current invention, other viewers or access software may operate on the client device for accessing networked resources.

According to the current invention, first party instructions 100A direct a client device accessing a networked content publisher to submit a request to a synchronization system wherein the request comprises the values of one or more synchronization system client tracking identifiers resident on the client device, if obtainable. For the example illustrated in FIG. 1, the synchronization system client tracking identifiers are third party client tracking identifiers, external to the networked content publisher's security domain. Note that in some examples, the synchronization system client tracking identifiers may or may not be considered third party client tracking identifiers. According to the current invention, the request may comprise one or more types of client tracking identifiers such as, but are not limited to, cookies, session cookies, persistent cookies, first party cookies, third party cookies, Unique Identifiers (UIDs), variables stored in an application cache and/or variables stored in a browser cache.

Depending on the implementation, client tracking identifiers may be stored in one or more location such as, but not limited to, a browser cache, an application cache and/or a file resident on the client; examples of storage locations for client tracking identifiers include, but are not limited to a browser cache 16, a cookie table 18, a file 19 and/or values stored in an Internet Explorer or other browser UserData data storage mechanisms. In some cases, client tracking identifiers may be mapped, encoded and/or embedded in other identifiers and/or variables such as, but not limited to, an eTag (Entity Tag) or an HTTP "last modified" field. In some cases, client tracking identifiers may or may not be encrypted.

In various examples according to the current invention, client tracking identifiers may be used to identify a client hardware device, a software client, an instance of client software, an individual and/or a group of individuals. In some cases, external to the current invention, activities, attributes and/or behaviors may be tracked and associated with client tracking identifiers for a variety of purposes such as, but not limited to, marketing and/or advertising. In some cases, one or more databases external to the current invention may be used to correlate activities, attributes and/or behaviors referenced by client tracking identifiers; in some cases, correlations between data collected, processed and/or stored at more than one related and/or unrelated networked location may be established and may or may not be available to the synchronization system.

According to the current invention, one or more client tracking identifiers per client device may be associated with a single security domain or sub-domain. In some cases, for example, more than one first party cookie may be associated with a single security domain or sub-domain. Similarly, more than one third party cookie may be associated with a single security domain or sub-domain. In some cases, multiple client tracking identifiers may be used in an attempt to independently track multiple individuals using the same hardware client or client software installation. In some cases, multiple tracking identifiers may be used to track more complex activities, attributes and/or behaviors.

According to the current invention, the first party instructions are meant to be executed on the client device. However, in some cases, some instructions may not be fully or successfully executed at the client. This may be due to a variety of reasons such as, but not limited to, security measures implemented on the client device and/or on some portion of the network between the client device and the networked content publisher. Examples include, but are not limited to, cookie blocking by a browser application, storage of incorrect values by a proxy server, firewall security measures and other browser or plug-in configurations for disabling stored values. Furthermore, in some cases, requests for client tracking identifiers may result in null or corrupt client tracking identifier values. For example, a first and/or third party cookie may have been deleted or corrupted by security software and subsequent requests for the value of the first or third party cookie may result in a null value, a corrupt value, an altered value or some indication that the cookie does not exist.

According to an example of the current invention, the first party instructions may comprise an HTML tag embedded in a webpage stored at or accessible by the first network resource. In some cases, when the content is retrieved and displayed, the HTML tag is executed by the client system, resulting in an HTTP request transmitted to the synchronization system. However, a content request may or may not result in the fresh retrieval of content from the first network resource. For example, in some cases, a cached and/or unexpired copy of the content may be available in the browser cache or stored in a network optimization system which may provide an unexpired copy of the content without requesting it from the first network resource. In some cases, an eTag (Entity Tag) may be used to determine if the cached or stored content is still valid ("fresh") or expired ("stale"). Note that the use of cached copies of content and/or the use of network optimization systems which may cache copies of content for networks, subnets, LANs (local area networks) and/or workgroups can sometimes interfere with accurate accounting of website visits when only considering freshly served pages.

According to the current invention, the request may or may not comprise multiple parts which may be transmitted to the synchronization system in one or more portions and/or transmissions. For example, in some cases, the request may comprise multiple parts which are transmitted directly and/or indirectly to the synchronization server. In some cases, a request or a portion thereof may be directed to an external resource (such as, but not limited to, a networked server external to the synchronization server) before being directed or relayed to the synchronization server.

According to the current invention, a synchronization system comprises: a receiver for receiving the request, a composer for generating setting instructions for selecting synchronized values for client tracking identifiers, and an output for sending the setting instructions to the client device for execution at the client device. For the example illustrated in FIG. 1, the receiver 100B, composer 100C, and output 100D are all implemented in software and are resident on synchronization system 20. In some cases, the synchronization system may be implemented on a single server and/or hardware platform. However, in other examples according to the current invention, the receiver, composer and/or output may be implemented in one or more hardware, software and/or firmware elements.

Furthermore, in some examples according to the current invention, various elements of the current invention may be distributed across one or more persistently and/or intermittently coupled software, firmware and/or hardware systems. For example, the receiver, composer and/or output, and/or portions thereof may be distributed across one or more software, firmware and/or hardware systems. Furthermore, in some cases, elements of the current invention may interact with one or more entities external to the current invention. For example, in some cases, the composer may interact with one or more external databases and/or systems when composing setting instructions.

According to the current invention, the receiver receives the request from the client device. For example, in some cases, the request may be an HTTP request, the synchronization system may be a web server, and the receiver may correspond to the modules within the web server system which receive HTTP requests. As previously discussed, the request comprises the values of obtainable synchronization system client tracking identifiers resident on the client device. In some cases, additional information may be included in the request such as, but not limited to, previous values for one or more of the first party and/or third party client tracking identifiers and/or other variables such as browser cache variables and/or cache variables which may represent past values of other client tracking identifiers such as first party client tracking identifiers. In some cases, elements internal and/or external to the current invention may screen, validate and/or monitor client identifier tracking values for corruption; in some cases, corrupted values may be recorded, replaced, repaired or ignored for the purposes of subsequent processing.

According to the current invention, the composer has access to the one or more values of the synchronization system client tracking identifiers resident on the client device, if available, which were incorporated into the request. In some cases, the composer may also have access to other information such as, but not limited to, other portions of the request. The composer may or may not be directly coupled to the receiver; in some cases, the receiver may transmit the request or portions thereof to the composer; in some cases, the composer may request portions of the request from the receiver; in some cases, information may be transferred from the receiver to the composer through shared access to memory and/or a file system; in some cases, optional components and/or components external to the current invention may execute and/or enable the transfer of information. Similarly, the composer may or may not be directly coupled to the output.

According to the current invention, the composer generates setting instructions for execution at the client device. The setting instructions comprise instructions to use a client-executed convergent selection method to select values for one or more networked content publisher client tracking identifiers. When a particular client repeatedly accesses one or more networked resources for providing content which are instrumented according to the current invention, client-executed convergent selection methods will be repeatedly invoked to select and set the networked content publisher client tracking identifiers. A convergent selection method is designed so that the set of resulting client tracking identifiers will converge to a small pool of client tracking identifiers for many operational cases. One example of a setting instruction using a convergent selection method is an instruction to examine existing client tracking identifiers, select the oldest value and instruct the client to set the client tracking identifiers (where possible) to the same, oldest value.

Optionally, the setting instructions may further comprise instructions for setting one or more synchronization system client tracking identifiers. For example, the setting instructions may instruct the client to set a synchronization system client tracking identifier and/or third party cookie which may or may not be based on the value of any received third party client tracking identifiers. For example, in the case where there is no existing synchronization system client tracking identifier, the setting instructions may instruct the client to set a synchronization system client tracking identifier to a new value, provided by the synchronization server. For example, in some cases, this may be provided in an HTTP header using a "set-cookie" header. Note that in some cases, the setting instructions may comprise more than one type of instruction. For example, in some cases, some portion of the setting instructions may comprise HTTP header instructions whereas one or more other portions of the setting instructions may comprise one or more scripts and/or programs such as, but not limited to, JavaScript™ scripts. In some cases, setting instructions may instruct the client to set and/or reset browser cache variables, application variables and/or application cache variables instead of or in addition to setting or resetting synchronization system client tracking identifiers.

In some examples according to the current invention, a current and/or previous value of one or more synchronization system client tracking identifiers, networked content publisher client tracking identifiers, third party cookies and/or one or more first party cookies may be preserved in a cache as one or more cache variables. Examples of cache variables may include, but are not limited to, a browser cache variable, Internet Explorer or other browser UserData storage mechanisms and/or an application cache variable. For example, in some cases, previously executed setting instructions or other applications may have established browser cache variables reflecting synchronization system client tracking identifiers, networked content publisher client tracking identifiers, first and/or third party cookie values at various points in time. In one example according to the current invention, the synchronization system may provide setting instructions which instruct the client to use a convergent selection method taking into account available cache variables. For example, the setting instructions may instruct the client to set the synchronization system client tracking identifier and the networked content publisher client tracking identifier to the oldest of the synchronization system client tracking identifier, the networked content publisher client tracking identifier and one or more relevant cache variables.

In some cases, the age and/or relative age of a client tracking identifier may be estimated or determined based on its value; in some cases, the age and/or relative age of a client tracking identifier may be estimated or determined using other mechanisms such as, but not limited to, a database look-up. Re-using a previously used client tracking identifier value instead of issuing a new client tracking value, slows the proliferation of the number of client tracking values associated with a particular client. Furthermore, if multiple networked content providers are instrumented according to some examples according to the current invention for a particular synchronization system, over time, visitors to these websites will tend to have their synchronization system client tracking identifiers as well as multiple first party client tracking identifiers (from a variety of instrumented networked content publishers) associated with different security domains reconfigured to the same, convergent value. Referring to a preceding example, using a convergent selection method based on selecting the oldest client tracking identifier associated with websites would correspond to converging on the oldest cookie value for some cases.

According to the current invention, a variety of convergent selection methods may be used in conjunction with the current invention. For example, a convergent selection method may comprise applying a hash function to client tracking identifier values, and selecting the smallest (or largest) hash value.

Note that in the preceding example, the values of the synchronization system client tracking identifiers and the networked content publisher client tracking identifiers (in that example, third party cookies and first party cookies) were set to the same value. However, in some cases, the values of various client tracking identifiers may be set to non-identical, but related or cognate values.

In some examples according to the current invention, the setting instructions may instruct the client to generate a new client tracking identifier value such as, but not limited to, a value generated by concatenating one or more previously used client tracking identifier values and one or more new client tracking identifier values.

In some examples according to the current invention, the setting instructions comprise additional instructions such as, but not limited to, a set of reporting instructions. For example, reporting instructions may instruct the client device to transmit reporting information to a third network resource. Examples of reporting information include, but are not limited to: the value of one or more synchronization system client tracking identifiers, networked content publisher client tracking identifiers, first party cookies, third party cookies, cache variables, client tracking identifiers before and/or after execution of some or all of the other setting instructions. In some cases, the third network resource may be external to the synchronization system. However, in other examples according to the current invention, the third network resource may be internal to the synchronization system. For example, in some cases, the same server may host both the content server and the third network resource. Note that in some cases, even when content is accessed from a cached copy (as described above), the reporting instructions may be invoked. For example, as a possible result, using reporting instructions in conjunction with a website may enable the third network resource to provide an estimate of the number of times website content has been viewed, taking into account content viewed from cached copies.

Optionally, in some examples according to the current invention, some or all of the reporting data may be provided to the synchronization system. Optionally, when the synchronization system receives some or all of the reporting data, it may examine the data and generate one or more synchronization system client tracking identifiers using a convergent selection method executed at the synchronization system. Like the client-executed convergent selection method, the server-executed convergent selection method is designed so that the set of resulting client tracking identifiers will converge to a small pool of client tracking identifiers for many operational cases. One example of a setting instruction using a convergent selection method is an instruction to examine all reported client tracking identifiers and select the oldest value. The synchronization system then composes a second set of setting instructions for execution at the client instructing the client to set the one or more synchronization system client tracking identifiers. For example, in some cases, this may be provided in an HTTP header using a "set-cookie" header. Note that in some cases, the second set of setting instructions may comprise more than one type of instruction. For example, in some cases, some portion of the second set of setting instructions may comprise HTTP header instructions whereas one or more other portions of the second set of setting instructions may comprise one or more scripts and/or programs such as, but not limited to, JavaScript™ scripts. In some cases, the second set of setting instructions may instruct the client to set and/or reset networked content publisher client tracking identifiers, first party client tracking identifiers, browser cache variables, application variables and/or application cache variables instead of or in addition to setting or resetting synchronization system client tracking identifiers.

Optionally, in some examples according to the current invention, the synchronization server may send the second set of setting instructions to the client for execution at the client.

FIG. 2 illustrates a method flow according to an example of the current invention. An example method begins when first party instructions are established on a networked content publisher (Step 200). According to an example of the current invention, the networked content publisher provides content and the first party instructions to a client device in response to a request for the content from the client device. The first party instructions direct the client device to submit a request to a synchronization system wherein the request comprises the values of one or more synchronization system client tracking identifiers. The method continues when the first party instructions are executed at the client device thereby submitting the request to the synchronization system (Step 210). The method continues when the request is received at the synchronization system and the setting instructions are composed at the synchronization system in response to the request (Step 220). According to an example of the current invention, the setting instructions instruct the client to use a convergent selection method to select client selected synchronized values for client tracking identifiers comprising synchronization system client tracking identifiers and networked content publisher client tracking identifiers. Optionally, the setting instructions may further comprise additional instructions such as, but not limited to, reporting instructions directing the client to report information to a third network resource. Examples of the information include, but are not limited to: the values of synchronization system client tracking identifiers, networked content publisher client tracking identifiers, first party client tracking identifiers, third party client tracking identifiers, application variables and/or cache variables evaluated before and/or after the client has executed some or all of the other setting instructions. The method continues when the setting sending instructions are sent to the client device for execution at the client device (Step 230). Optionally, the method continues when the setting instructions are received and executed at the client device (Step 240). Optionally, the method continues when the optional reporting instructions are executed and information is sent to a third network resource (Step 250). Optionally, the method continues when the synchronization system receives some or all of the reporting information (Step 260). In some cases, the third network resource is the synchronization system or is coupled to the synchronization system; in some cases, the third network resource relays some or all of the reporting information to the synchronization system. Optionally, the synchronization system composes a second set of setting instructions using a server executed convergent selection method (Step 270). In some cases, the second set of setting instructions may comprise additional instructions such as, but not limited to, instructions to set and/or reset cache variables, application variables, client tracking identifiers and/or cookies. Optionally, the synchronization server sends the second set of setting instructions to the client for execution at the client (Step 280). Optionally, the client receives the second set of setting instructions and executes them (Step 290).

Example transactions consistent with the operation of two different examples of the current invention are illustrated below, for a particular client accessing multiple instrumented content providers. In these examples, the content providers are websites which the client accesses through a browser, subject to a "same origin" security policy. In Example 1, the browser cache is kept updated with copies of cookie values. In Example 2, the setting instructions comprise reporting instructions and a second set of setting instructions are used to set (or reset) the synchronization system client tracking identifiers (third party cookies, in this example).

Example 1

Client Visits a First Instrumented Content Provider (Website A) for the First Time In this example, the client visits website A, an instrumented content provider, for the first time. In this case, the first party instructions are stored on a website A as an HTML tag. Because this is the first time an instrumented content provider has been accessed, there are no networked content publisher client tracking identifiers (first party cookies associated with Website A, in this example) or synchronization system client tracking identifiers (third party cookies associated with the synchronization system, in this example). After accessing Website A, the client submits a request to the synchronization system based on the HTML tag. The client does not provide a third party cookie value. The synchronization system receives the request; the composer generates setting instructions enabling the client to select a first party cookie value. In this example, according to the convergent selection method, the client selects the oldest client tracking identifier value it can find and sets the first party cookie to that value. As part of this process, the instructions may instruct the client to examine various cache variables and/or application variables which could represent client tracking identifiers. There is no first party cookie value in this case and if no other client tracking identifiers are located, the client selects a new first party cookie according to the setting instructions. In this case, the synchronization system further instructs the client to set the third party cookie to a new value using a "set-cookie" value provided in an HTTP header. In some cases, the synchronization system may select one or more third party cookie values using the same algorithm used to create a new first party cookie(s) so that one or more third party cookies are equal to one or more of the new third party cookies; in some cases, the third party cookies may be set to a new value using an algorithm similar to the algorithm used to create a new first party cookies so that the new third party cookies have values related to (but not identical to) the new first party cookie. Additionally, in this example, the setting instructions instruct the client to store copies of the first party cookie value and the third party cookie value in browser cache variables.

Client Visits a Second Instrumented Content Provider (Website B) for the First Time The client does not have a first party cookie associated with Website B, but it does have a third party cookie associated with the synchronization server as well as copies of the first party cookie and the third party cookie stored as browser cache variables. After accessing website B, the client submits a request to the synchronization system, providing the third party cookie to the synchronization system. The synchronization system receives the request; the composer generates setting instructions directing the client to set the first party cookie value to the oldest client tracking identifier available, based on the convergent selection method. Again, in some cases, browser cache variables and/or application variables may be examined by the client when selecting the oldest client tracking identifier. In this example, the convergent selection method is based on repeatedly selecting the oldest client tracking identifier. In this case, the synchronization system will attempt to select the oldest client tracking identifier for the third party cookie too. In some cases, the synchronization system will inspect the available third party cookies for validity and/or corruption. In this example, a valid third party cookie value received in the request would not be replaced with a newer third party cookie; however, an invalid, corrupt or missing third party cookie could be replaced with a new third party cookie. A browser cache variable is created or updated with the new first party cookie value and new third party cookie value, where relevant.

Client Deletes all Third Party Cookies

In this scenario, the client then deletes all third party cookies. However, first party cookies are preserved, and the value of both the first party cookie and the third party cookie may be preserved in the browser cache, as well as other browser cache variables possibly representing client tracking identifiers.

Client Visits Website A for the Second Time

There are no third party cookies associated with the synchronization system, but there is a first party cookie associated with Website A. After accessing Website A, the client submits a request to the synchronization system, providing no third party cookie value. The synchronization system receives the request; the composer generates setting instructions comprising a third party cookie value (in this case, it is in the form of an HTTP header) and instructions to set the first party cookie value to the oldest client tracking identifier it can locate. Browser cache variables representing the first and third party cookies are updated.

Client Deletes all First Party Cookies Associated with Website B

In this scenario, the client then deletes all first party cookies associated with Website B.

Client Visits Website B

After accessing Website B, the client submits a request to the synchronization system, providing the third party client tracking identifier to the synchronization system. The synchronization system receives the request; the composer generates setting instructions instructing the client to set the first party cookie value to the oldest client tracking identifier it can locate. As before, instructions to reset the value of the third party cookie are only incorporated in the setting instructions if the third party cookie(s) are corrupt or invalid. Browser cache variables representing the first and third party cookies are updated.

Client Deletes all Cookies

The client then deletes all first party cookies and third party cookies.

Client Visits Website B

After accessing Website B, the client submits a request to the synchronization system. There is no third party cookie available to be sent with the request. The synchronization system receives the request; the composer generates setting instructions directing the client to set the first party cookie value to the oldest client tracking identifier it can locate. As before, instructions are also submitted to set a new value for the third party cookie. Browser cache variables representing the first and third party cookies are created or updated.

Example 2

Client Visits a First Instrumented Content Provider (Website A) for the First Time In this example, the client visits website A, an instrumented content provider, for the first time. In this case, the first party instructions are stored on a website A as an HTML tag. Because this is the first time an instrumented content provider has been accessed, there are no first party cookies associated with Website A or third party cookies associated with the synchronization system. After accessing Website A, the client submits a request to the synchronization system based on the HTML tag. The client does not provide a third party cookie value. The synchronization system receives the request; the composer generates setting instructions enabling the client to select a first party cookie value. Note that in this example, the setting instructions comprise reporting instructions. In this case, the reporting instructions direct the client to provide the values of the first and third party cookies as well as any identifiable client tracking identifiers both before and after the other setting instructions have been executed. In this example, according to the convergent selection method, the client selects the oldest client tracking identifier value it can find and sets the cookie to that value. As part of this process, the instructions may instruct the client to examine various cache variables and/or application variables which could represent client tracking identifiers. There is no first party cookie value in this case and if no other client tracking identifiers are located, the client selects a new first party cookie according to the setting instructions. In this case, the synchronization system further instructs the client to set the third party cookie to a new value using a "set-cookie" value provided in an HTTP header. In some cases, the synchronization system may select one or more third party cookie values using the same algorithm used to create a new first party cookie(s) so that one or more third party cookies are equal to one or more of the new third party cookies; in some cases, the third party cookies may be set to a new value using an algorithm similar to the algorithm used to create a new first party cookies so that the new third party cookies have values related to (but not identical to) the new first party cookie. Additionally, in this example, the setting instructions instruct the client to store copies of the first party cookie value and the third party cookie value in browser cache variables. Based on the reporting instructions, the reporting information is sent to a third party server. In this case, the third party server is part of the synchronization server. The synchronization server inspects the client tracking identifiers it has received and selects the oldest one for the third party cookie value. If the reported third party cookie value is not the same as the selected third party cookie value, the synchronization server sends a second set of setting instructions to the client instructing it to reset the third party cookie value to the oldest client tracking identifier value identified by the synchronization system.

Client Visits a Second Instrumented Content Provider (Website B) for the First Time The client does not have a first party cookie associated with Website B, but it does have a third party cookie associated with the synchronization server as well as copies of the first party cookie and the third party cookie stored as browser cache variables. After accessing website B, the client submits a request to the synchronization system, providing the third party cookie to the synchronization system. The synchronization system receives the request; the composer generates setting instructions directing the client to set the first party cookie value to the oldest client tracking identifier available, based on the convergent selection method. Again, in some cases, browser cache variables and/or application variables may be examined by the client when selecting the oldest client tracking identifier. In this example, the convergent selection method is based on repeatedly selecting the oldest client tracking identifier. In this case, the synchronization system will attempt to select the oldest third party cookie too. In some cases, the synchronization system will inspect the available third party cookies for validity and/or corruption. In this example, a valid third party cookie would not be replaced with a newer third party cookie; however, an invalid, corrupt or missing third party cookie could be replaced with a new third party cookie. A browser cache variable is created or updated with the new first party cookie value and new third party cookie value, where relevant. The client sends the client tracking identifiers to the synchronization server according to the reporting instructions. The synchronization server inspects the client tracking identifiers it has received and selects the oldest one it can identify for the third party cookie value. Because the reported third party cookie value is not the same as the selected third party cookie value, the synchronization server sends a second set of setting instructions to the client instructing it to reset the third party cookie value to the oldest client tracking identifier value identified by the synchronization server.

Client Deletes all Third Party Cookies

In this scenario, the client then deletes all third party cookies. However, first party cookies are preserved, and the value of both the first party cookie and the third party cookie may be preserved in the browser cache, as well as other browser cache variables possibly representing client tracking identifiers.

Client Visits Website A for the Second Time

There are no third party cookies associated with the synchronization system, but there is a first party cookie associated with Website A. After accessing Website A, the client submits a request to the synchronization system, providing no third party cookie value. The synchronization system receives the request; the composer generates setting instructions comprising a third party cookie value (in this case, it is in the form of an HTTP header) and instructions to set the first party cookie value to the oldest client tracking identifier it can locate. Browser cache variables representing the first and third party cookies are updated. The client sends the client tracking identifiers to the synchronization server according to the reporting instructions. The synchronization server inspects the client tracking identifiers it has received and selects the oldest one for the third party cookie value. If the reported third party cookie value is not the same as the selected third party cookie value, the synchronization server sends a second set of setting instructions to the client instructing it to reset the third party cookie value to the oldest client tracking identifier value identified by the synchronization server.

Client Deletes all First Party Cookies Associated with Website B

In this scenario, the client then deletes all first party cookies associated with Website B.

Client Visits Website B

After accessing Website B, the client submits a request to the synchronization system, providing the third party client tracking identifier to the synchronization system. The synchronization system receives the request; the composer generates setting instructions instructing the client to set the first party cookie value to the oldest client tracking identifier it can locate. As before, instructions to reset the value of the third party cookie are only incorporated in the setting instructions if the third party cookie(s) are corrupt or invalid. Browser cache variables representing the first and third party cookies are updated. The client sends the client tracking identifiers to the synchronization server according to the reporting instructions. The synchronization server inspects the client tracking identifiers it has received and selects the oldest one for the third party cookie value. If the reported third party cookie value is not the same as the selected third party cookie value, the synchronization server sends a second set of setting instructions to the client instructing it to reset the third party cookie value to the oldest client tracking identifier value identified by the synchronization server.

Client Deletes all Cookies

The client then deletes all first party cookies and third party cookies.

Client Visits Website B

After accessing Website B, the client submits a request to the synchronization system. There is no third party cookie available to be sent with the request. The synchronization system receives the request; the composer generates setting instructions directing the client to set the first party cookie value to the oldest client tracking identifier it can locate. As before, instructions are also submitted to set a new value for the third party cookie. Browser cache variables representing the first and third party cookies are created or updated. The client sends the client tracking identifiers to the synchronization server according to the reporting instructions. The synchronization server inspects the client tracking identifiers it has received and selects the oldest one for the third party cookie value. If the reported third party cookie value is not the same as the selected third party cookie value, the synchronization server sends a second set of setting instructions to the client instructing it to reset the third party cookie value to the oldest client tracking identifier value identified by the synchronization server.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by claims following.

What is claimed is:

1. A computer-implemented method for synchronizing a first value comprising a value of a first party networked content publisher client tracking identifier with a second value comprising a value of a third party synchronization system client tracking identifier on a client device, the computer-implemented method comprising:
 receiving a selection instruction request comprising the second value wherein the selection instruction request was submitted by the client device as directed by first party instructions, provided to the client device in response to a content request from the client device to a first party networked content publisher;
 responsive to receiving the selection instruction request, composing setting instructions at a third party synchronization system wherein the setting instructions comprise instructions to the client device to use a convergent selection method thereby enabling the client device to set the first value to a value selected by the client device; and
 sending the setting instructions to the client device for execution at the client device.

2. The method of claim 1 wherein:
 the setting instructions further comprise instructions for setting the second value at the client device.

3. The method of claim 1 wherein:
 the second value comprises a value of one or more client tracking identifiers selected from the list of: a cookie, a third party cookie, a cache variable, an application variable and an application cache variable.

4. The method of claim 1 wherein:
 the first value comprises a value of one or more client tracking identifiers selected from the list of: a cookie, a first party cookie, a cache variable, an application variable and an application cache variable.

5. The method of claim 1 wherein:
 the selection instruction request to the third party synchronization system further comprises data selected from the list of: one or more cache variable values, one or more application variable values, one or more application cache variable values.

6. The method of claim 1 wherein:
 the client-executed convergent selection method comprises the steps of:
 identifying one or more oldest client tracking identifier values; and
 selecting the one or more oldest client tracking identifier values for the first value.

7. The method of claim 1 wherein:
 the client-executed convergent selection method comprises the steps of:
 identifying one or more client tracking identifier values; and
 generating a new value for the first value based at least in part on the values of the one or more client tracking identifiers.

8. The method of claim 1 wherein the setting instructions further comprise:
 reporting instructions comprising instructions directing the client device to provide reporting information to a third network resource.

9. The method of claim 8 wherein the reporting information comprises data evaluated after the client device has executed at least some of the setting instructions wherein the data is selected from the list of: the value of one or more networked content publisher client tracking identifiers, the second value, the first value, the value of one or more third party client tracking identifiers, the value of one or more cache variables, the value of one or more application variables and the value of one or more application cache variables.

10. The method of claim 8 wherein the reporting information comprises:
   data evaluated before the client device has executed the setting instructions wherein the data is selected from the list of: the value of one or more networked content publisher client tracking identifiers, the second value, the first value, the value of one or more third party client tracking identifiers, the value of one or more cache variables, the value of one or more application variables, the value of one or more application cache variables.

11. The method of claim 8 wherein the third party synchronization system comprises the third network resource.

12. The method of claim 8 wherein the third network resource is external to the third party synchronization system.

13. The method of claim 1 wherein:
   composing setting instructions comprises composing setting instructions at the third party synchronization system in response to the instruction request, without having received the first value from the client device.

14. A hardware system for synchronizing a first value comprising a value of a first party networked content publisher client tracking identifier with a second value comprising a value of a third party synchronization system client tracking identifier on a client device, the hardware system comprising:
   a receiver for receiving a selection instruction request including a second value wherein the selection instruction request was submitted by the client device as directed by first party instructions, provided to the client device in response to a content request from the client device to a first party networked content publisher;
   a composer for composing setting instructions at a third party synchronization system in response to the selection instruction request to the third party synchronization system, wherein the setting instructions comprise:
      instructions to use a client-executed convergent selection method wherein the convergent selection method enables the client device to set the first value to a value selected by the client device; and
   an output for sending the setting instructions to the client device for execution at the client device.

15. The hardware system of claim 14 wherein:
   the setting instructions further comprise instructions for setting one or more third party synchronization system client tracking identifiers at the client device.

16. The hardware system of claim 14 wherein:
   the setting instructions further comprise reporting instructions comprising instructions directing the client device to report information to a third network resource.

* * * * *